INVENTOR.
ARNOLD T. RIEDI

Feb. 17, 1970 A. T. RIEDI 3,495,358
SURFACE TREATMENT APPARATUS
Filed Feb. 9, 1968 4 Sheets-Sheet 4

INVENTOR.
ARNOLD T. RIEDI
BY
ATTORNEY

United States Patent Office 3,495,358
Patented Feb. 17, 1970

3,495,358
SURFACE TREATMENT APPARATUS
Arnold T. Riedi, Medford, Oreg., assignor to American Machine & Foundry Company, a corporation of New Jersey
Filed Feb. 9, 1968, Ser. No. 704,293
Int. Cl. B24b 23/00, 55/06, 55/02
U.S. Cl. 51—177                                   6 Claims

ABSTRACT OF THE DISCLOSURE

Rotary sanding apparatus, including an abrasive screen, a drive disc adapted to be placed on top of the abrasive screen, and means mounted on the drive disc for imparting rotary movement thereto. The drive disc includes a plurality of depending lugs with voids therebetween and a central aperture that communicates with a passageway leading to a vacuum source or the like. The flow of air established by the vacuum source from the periphery of the drive disc through the voids to the central aperture operates to draw particles removed from the surface upwardly through the openings in the screen into the voids between the lugs of the drive disc and inwardly to the central aperture, and from there to a collection bag.

---

This invention relates to apparatus for treating planar surfaces, and more particularly to a rotary abrading device for wood floors.

The major problems encountered in surface treatment equipment is the disposal of the particles, such as wood dust, created by their use. Some of these particles are thrown outwardly, thus creating a cleanup problem, while a great many others are trapped underneath the treating surface, thus reducing the effectiveness of the device. This problem is particularly acute when the planar surface is horizontal such as a floor, since gravity cannot assist in removing particles from beneath the treating surface.

In the past, this problem has been partially solved by attaching a vacuum source to the apparatus to remove the particles from beneath the treating surface. Exemplary of this approach is the surface treatment apparatus shown in U.S. Patent 2,814,171. The major drawback with this approach is that when the air between the vacuum source and the surface being treated has been exhausted, as it soon must be due to the closed nature of the apparatus, the vacuuming action will lose its efficiency. When this happens, the apparatus will have to be lifted or tipped to allow a new supply of air to enter the system. Needless to say, this reduces the speed and efficiency with which the apparatus operates.

SUMMARY

It is, accordingly, an object of this invention to provide an improved surface treatment apparatus.

It is a more specific object of this invention to provide surface treatment apparatus wherein waste material between the apparatus and the surface may be effectively and continuously removed.

It is a still more specific object of this invention to provide a rotary floor sanding machine having vacuum means to continuously remove wood dust from the area between the abrasive surface and the floor, the vacuum means being arranged such that it can draw from a continuous supply of air.

In accordance with these and other objects, the invention comprises in its broader aspects a surface treating element adapted to engage a surface to be treated, said element having active portions and spaces therebetween, means for driving said element, said driving means having voids therein that communicate with the spaces between the active portions of the surface treatment element and the atmosphere at the periphery of the driving means, and means generating subatmospheric pressure in the interior of said driving means for causing a flow of air inwardly from the periphery of said driving means through said voids toward said source of subatmospheric pressure and upwardly from between the active portions of said surface treatment elements into said voids to continuously remove particles from beneath said surface treating element.

In this manner the particles removed from the surface by the surface treatment element are continuously removed from the area therebeneath, thus precluding the reduction in abrading effectiveness resulting from the abrasive surfaces becoming clogged with particles, and greatly limiting the centrifugal dispersion of particles around the apparatus.

These and other features, objects and advantages of the invention will be understood more fully from a study of the following detailed description considered along with the accompanying drawings of which:

DESCRIPTION OF THE PREFERRED EMBODIMENT

Figure 1:
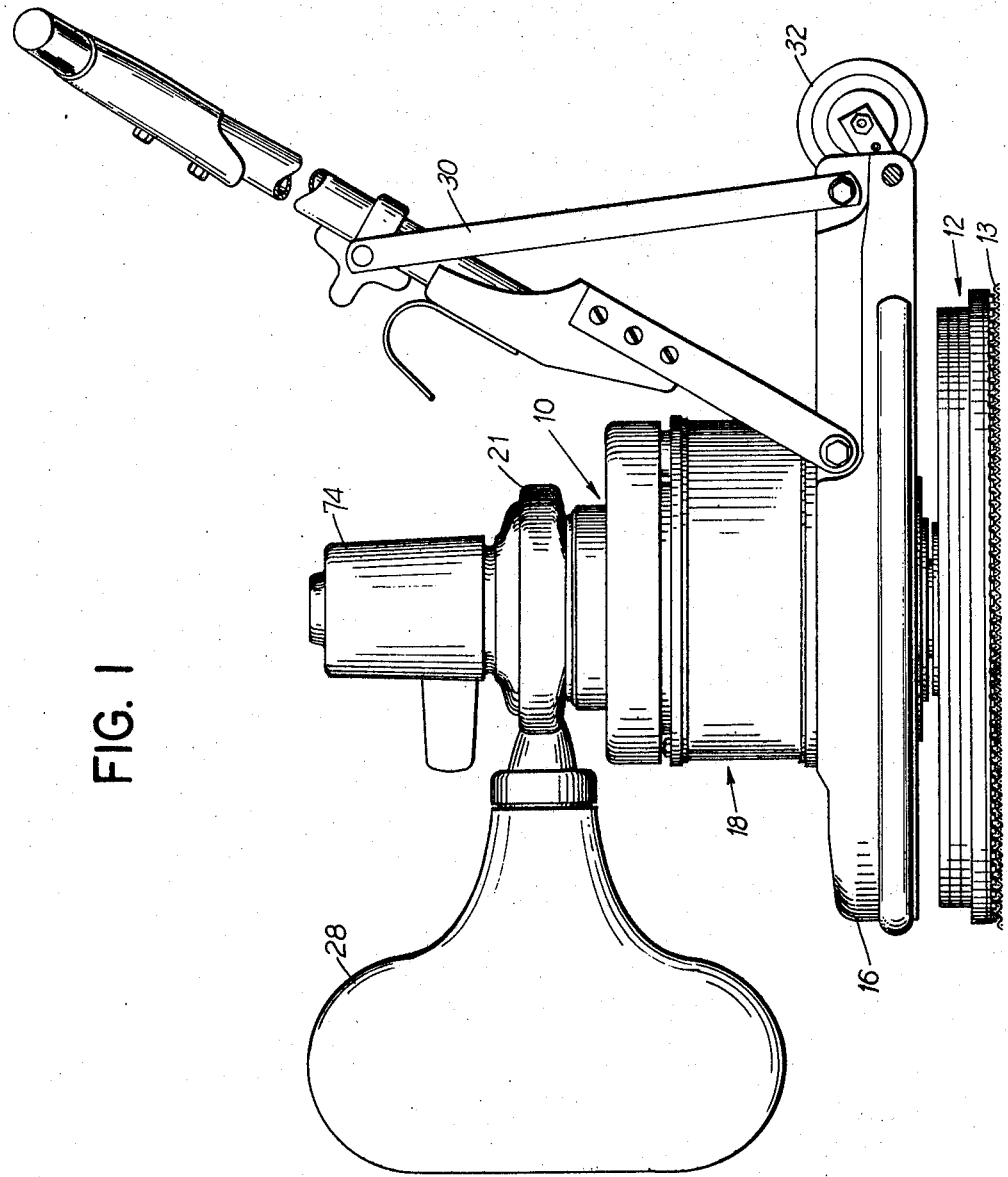
FIG. 1 is a side view of one embodiment of the invention.
Figure 2:
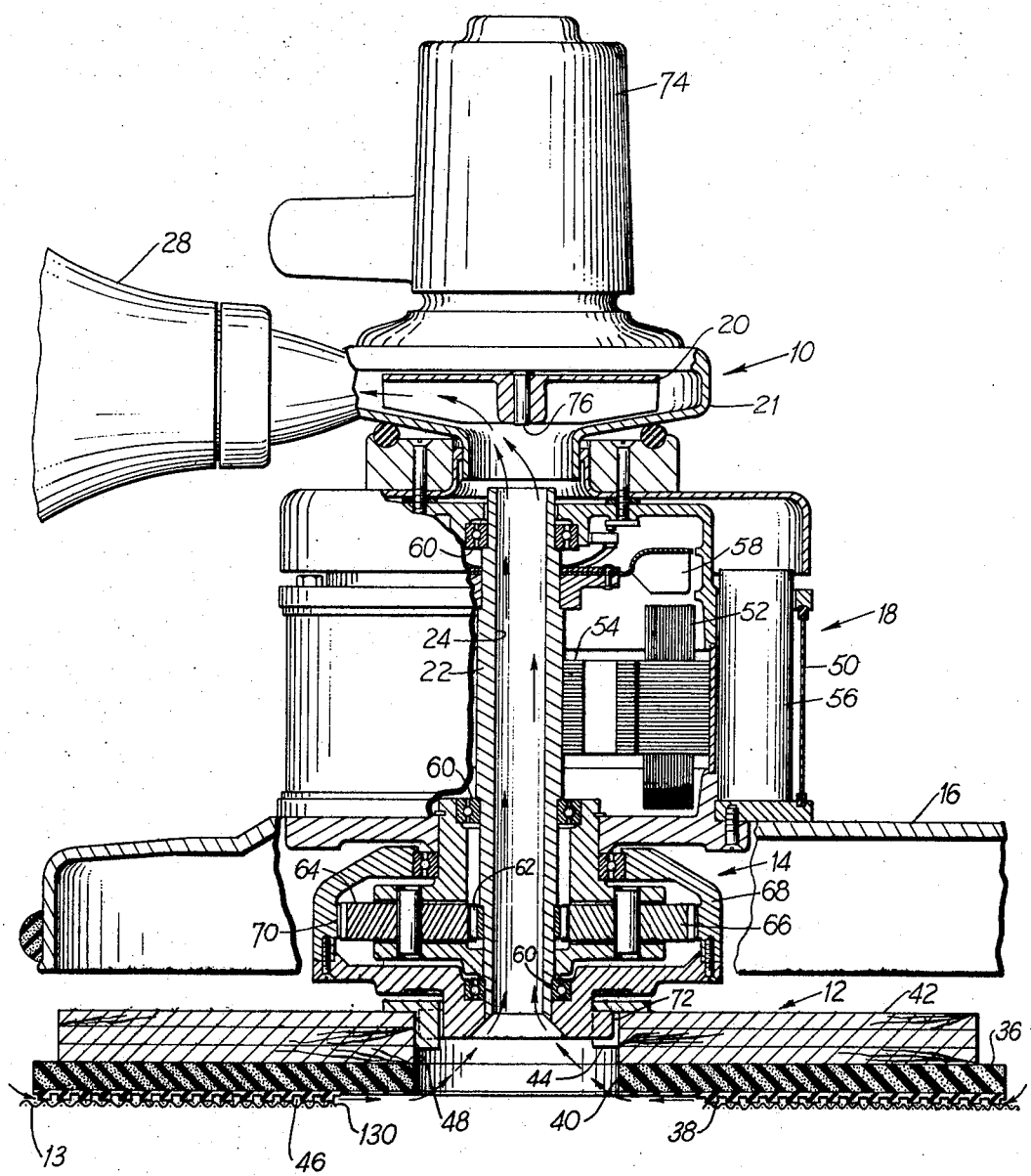
FIG. 2 is a side elevation view of the embodiment shown in FIG. 1, with portions thereof broken away to show the interior construction.

Referring now to FIGS. 1 and 2 of the drawings, apparatus according to one embodiment of the invention comprises a rotary machine 10 that generally includes a lower assembly 12, adapted to be placed over, or attached to, a surface treatment element 13, a gear assembly 14 covered by a shroud 16, drive motor means 18, an impeller 20 mounted in a housing 21; a shaft 22 having a passageway 24 therethrough that communicates with both impeller 20 and lower assembly 12, and a waste collection bag 28. A handle unit 30 having a wheel 32 is provided for tipping the machine 10 when desired, for example, for the cleaning or changing of surface treatment elements 13.

In the embodiments shown in FIGS. 1–5, which is a floor sanding machine, surface treatment element 13 is an abrasive screen. However, it should be understood that it could also be a perforated paper disc or the like.

Lower assembly 12 includes a drive disc 36 having depending lugs 38 for engaging and rotating the abrasive screen. A central aperture 40 is formed in drive disc 36. A drive plate 42 is connected to drive disc 36 and is connectable, at gear teeth 44, to gear assembly 14. Depending lugs 38 form voids 46 therebetween which form channels of communication between central aperture 40 and the atmosphere at the periphery of the drive disc. Drive plate 42 includes a central aperture 48 communicating with central aperture 40. Central apertures 40 and 48 communicate in turn with impeller housing 21 through shaft passageway 24 and subatmospheric pressure is generated thereby at central aperture 40. This causes an inward flow of air from the periphery of drive disc 36 through voids 46 to central aperture 40. Waste particles generated by the abrasive screen are thus drawn upward into voids 46 and are swept into central aperture 40 by the inward flow of air, and from there they are drawn into waste collection bag 28 through shaft passageway 24 by impeller 20.

Lower assembly 12 is rotated by motor drive means 18 through shaft 22 and gear assembly 14. Drive motor means 18 includes a housing 50, a stator 52 mounted therein, a rotor 54 driven by the stator and a condensor 56. A fan 58 attached to shaft 22 is provided to cool the motor.

Rotor 54 directly drives shaft 22 which is fixedly attached thereto. The shaft 22 is supported for rotation at spaced points by bearings 60. A gear element 62 is mounted on shaft 22 adjacent the lower end thereof. Two gear wheels, 64 and 66, are mounted in a stationary portion of gear assembly 14 and are rotated by gear element 62, with which they mesh. Gear wheels 64 and 66 in turn drive a cup-shaped member 68 through an annular internal gear 70. Cup-shaped member 68 includes a set of gear teeth 72 which, by meshing with gear teeth 44, drive lower assembly 12.

Impeller housing 21 is mounted on motor housing 50. An impeller drive motor 74 is mounted in impeller housing 21 and drives impeller 20 through an impeller shaft 76. The interior of impeller housing 21 communicates with waste collection bag 28 and with the atmosphere at the periphery of drive disc 36 through shaft passageway 24 central apertures 48 and 40 and voids 46 in drive disc 36.

Figure 3:
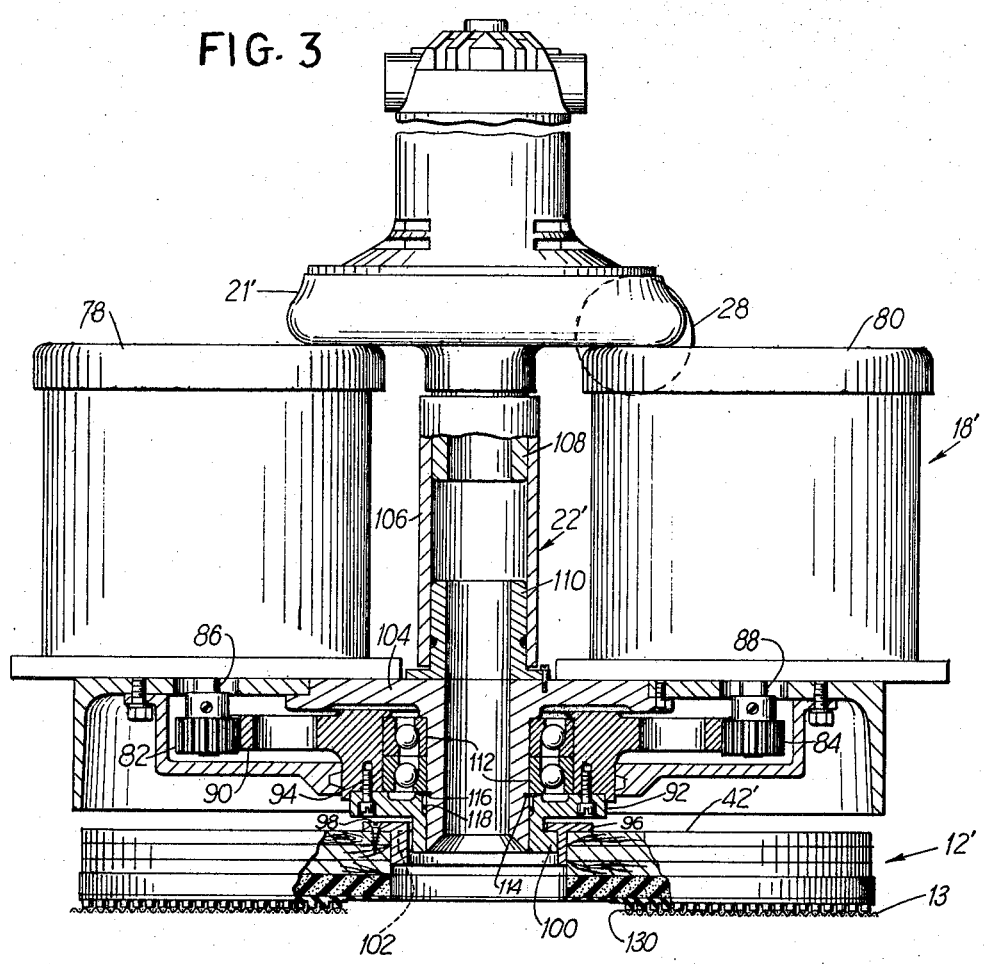
FIG. 3 is a side elevation view of another embodiment of the invention, with portions thereof broken away to show the interior construction.

The embodiment of the invention shown in FIGURE 3, differs from that shown in FIGS. 1 and 2 primarily only in the portions thereof between impeller housing 21' and lower assembly 12'.

In this embodiment, central shaft 22' is fixed rather than rotatable and drive motor means 18' comprises two electric motors 78 and 80, each drivingly connected to gear assembly 14' by spur gears 82 and 84 respectively, through motor shaft extensions 86 and 88. Spur gears 82 and 84 engage and drive a gear wheel 90, with motors 78 and 80 rotatable so that the action of spur gears 82 and 84 on gear wheel 90 are complementary.

The driving action of gear wheel 90 is transmitted to drive plate 42' of the lower assembly 12' through a first flanged sleeve 92 connected to gear wheel 90 by screws 94, and a second flanged sleeve 96 connected to the drive plate 42' by screws 98. The driving connection between the two flanged sleeves are gear teeth 100 on flanged sleeve 92 which are received in complementary shaped recesses 102 in flanged sleeve 96.

Shaft 22' of this embodiment comprises a hollow bearing post 104 which supports gear assembly 14', a hollow central post 106 and a hollow neck extension 108 of impeller housing 21'. Bearing post 104 and central post 106 are joined by coupling member 110 and neck 108 of impeller housing 21' is received in central post 106 to form a continuous shaft member having a continuous passageway between the impeller 20' and the central apertures in lower assembly 12'.

Bearing post 104 supports two opposing ball-type bearing rings 112 in a manner to resist downward machine pressure. A retainer clip 114, fitting in a retainer clip groove 116 in bearing post 104, keeps the revolving portion of the machine from dropping off the bearing post when the machine is raised for any purpose. An "O" ring 118 prevents lubricating grease from passing the clearance between bearing post 104 and first flanged sleeve 92.

Figure 4:
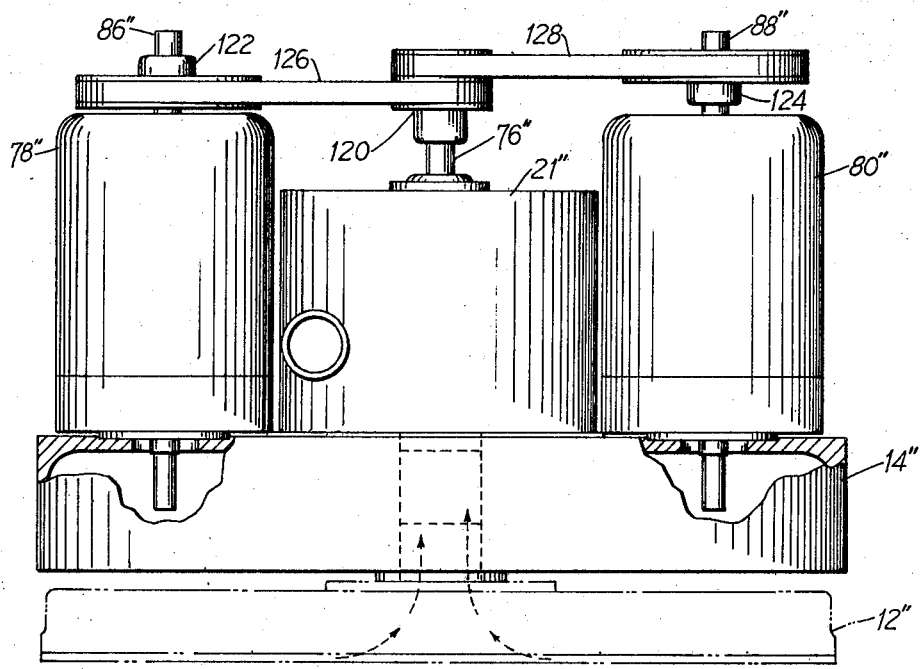
FIG. 4 illustrates still another embodiment of the invention.

The embodiment of the invention shown in FIG. 4 is a modification of the embodiment of FIG. 3. Lower assembly 12" and gear assembly 14" are identical to lower assembly 12' and gear assembly 14' of the embodiment shown in FIG. 3, and motors 78" and 80" are similar to motors 78 and 80. The difference in the two embodiments is that there is no separate drive for the impeller (not shown) in the embodiment of FIG. 4. Instead, impeller shaft 76" extends out of impeller housing 21" and includes a drive belt mount 120. Motor shaft extensions 86" and 88" are in parallel spaced relationship with impeller shaft 76" and include belt mounts 122 and 124 respectively. Drive belts 126 and 128 are mounted between belt mounts 122, 124 and 120 to drive impeller shaft 76" and thus the impeller of this embodiment.

Figures 5A, 5B:
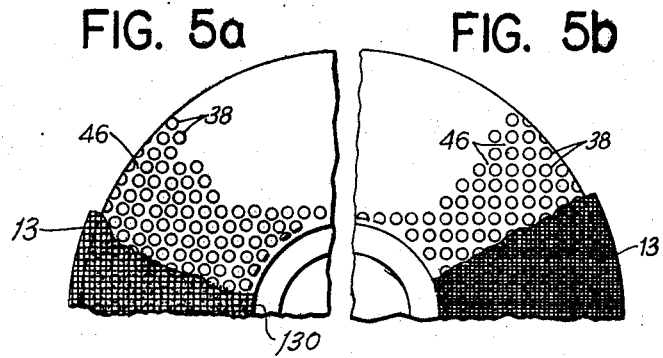
FIGS. 5a and 5b are partial bottom views of the apparatus shown in FIGS. 1–4.

Referring now to FIGS. 5a and 5b, two of the various arrangements of lugs 38 and voids 46 are shown in addition to the location of abrasive screen 13. This view clearly illustrates the channels of communication between central aperture 40 and the atmosphere at the periphery of disc 36 through voids 46.

It will be noted that abrasive screen 13 includes an aperture 130 in the center thereof in that it is of annular shape. The reason for aperture 130 is to provide for larger particles that cannot readily pass up through the opening in the abrasive screen. These particles will be slowly swept inwardly to aperture 130 and then be drawn upwardly through apertures 40 and 48 to passageway 24 and waste collection bag 28. And, it should be noted that by using a ⅜" long bristle rotary scrub brush, rather than an abrasive screen, a floor may be successfully scrubbed, and the water vacuumed up. Using the same brush, but in dry form, dust may be vacuumed from a concrete floor and vacuumed up. The apparatus may also be used to shampoo rugs and vacuum up the excess water.

When a brush is used with the instant apparatus, it would not be necessary to use a drive disc 34 with depending lugs 38 since the length and placement of the bristles would be equivalent to lugs 38, and the spacing between the bristles would be equivalent to voids 46.

The drive motors of the several embodiments, as well as the impeller motors, are connectible by appropriate wiring to a house electrical source. Conventional electrical switch means are provided to turn the motors on and off. When the motors are turned on, surface treatment element 13 is rotated to treat the surface to which it is being applied and the vacuum system continuously removes the particles generated thereby from thereunder.

What I claim is:
1. Surface treatment apparatus, comprising:
   a surface treating element adapted to engage a surface to be treated, said element having active portions and spaces therebetween,
   means for driving said element, said driving means having voids therein that communicate with the spaces between the active portions of the surface treating element and the atmosphere at the periphery of the driving means, and
   means generating subatmospheric pressure in the interior of said driving means for causing a flow of air inwardly from the periphery of said driving means through said voids toward said source of subatmosphere pressure and upwardly from between the active portions of said surface treatment element into said voids to continuously remove particles from beneath said surface treating element.

2. Surface treatment apparatus, which comprises:
   a surface treating element adapted to engage a surface to be treated, said surface treating element having active portions and spaces therebetween,
   means for driving said surface treating element, which means includes a central aperture and depending lugs which are adapted to engage and drive said surface treating element, the voids between said depending lugs communicating with the spaces between the active portions of the surface treating element, the central aperture and the periphery of the driving means, and
   means generating subatmosphere pressure at said central aperture for causing a flow of air upwardly through the spaces in the surface treating element and inwardly from the periphery of the disc, through the voids therein, to the central aperture to continuously remove particles from beneath said surface treating element.

3. Apparatus according to claim 2, wherein:
said surface treatment apparatus is a floor sanding device including an abrasive element which is an abrasive screen, the wood dust generated thereby being removed from thereunder by said flow of air.

4. Sanding apparatus, which comprises:
an abrasive screen,
a shaft having a passageway therethrough mounted adjacent to said abrasive screen,
means mounted on said shaft for driving said abrasive screen, the last named means including a drive disc having an aperture communicating with said shaft passageway, a plurality of spaced lugs for engaging said abrasive screen, and a plurality of voids between said lugs that form channels of communication between the atmosphere at the periphery of the disc and the aperture, and
means generating subatmosphere pressure adjacent one end of said shaft passageway for causing a flow of air and wood dust into said voids and inwardly from the periphery of the drive disc to the aperture therein and then through said shaft passageway toward said generating said subatmospheric pressure.

5. Sanding apparatus according to claim 4, wherein:
said means generating subatmospheric pressure is an impeller,
a housing enclosing said impeller is mounted adjacent said one end of said shaft, the interior of said housing communicating with said shaft passageway, and
a wood dust collection bag is connected to said impeller housing, the interior of the bag communicating with the interior of said impeller housing.

6. Sanding apparatus according to claim 4, wherein said means for driving said abrasive screen further comprises:
drive motor means supported by said shaft,
a drive plate connected to said drive disc, and
means drivingly connecting said drive motor and said drive plate.

References Cited
UNITED STATES PATENTS

| | | | |
|---|---|---|---|
| 2,166,757 | 7/1939 | Forss | 51—170.2 |
| 2,814,171 | 11/1957 | Bogart | 51—273 |
| 2,950,583 | 8/1960 | Nilsson | 51—177 |

OTHELL M. SIMPSON, Primary Examiner

U.S. Cl. X.R.
51—273, 356